United States Patent [19]

Coogler

[11] 4,323,994
[45] Apr. 6, 1982

[54] GEOPHONE SPRING

[75] Inventor: John M. Coogler, Houston, Tex.

[73] Assignee: Geosource Inc., Houston, Tex.

[21] Appl. No.: 136,291

[22] Filed: Mar. 31, 1980

[51] Int. Cl.³ .......................... G01V 1/16; F16F 1/34
[52] U.S. Cl. .................................. 367/183; 367/187; 267/158; 267/161
[58] Field of Search ............... 367/183, 187; 267/158, 267/161, 162

[56] References Cited

U.S. PATENT DOCUMENTS

| | | | |
|---|---|---|---|
| 2,407,757 | 9/1946 | MacCallum | 261/161 |
| 2,533,249 | 12/1950 | Henson | 367/183 |
| 2,751,573 | 6/1956 | Millington | 367/183 |
| 3,344,397 | 9/1967 | Elliott et al. | 267/161 |
| 3,451,040 | 6/1969 | Johnson | 367/187 |
| 3,582,290 | 6/1971 | Bellawela | 267/158 |
| 3,602,490 | 8/1971 | Mueller et al. | 267/161 |
| 3,688,668 | 6/1972 | Robetsheck | 267/158 |
| 3,742,441 | 6/1973 | Riley | 367/187 |
| 3,953,829 | 4/1976 | Boyle | 367/183 |
| 4,152,692 | 5/1979 | McNeel | 367/183 |

FOREIGN PATENT DOCUMENTS

| | | | |
|---|---|---|---|
| 501544 | 3/1951 | Belgium | 267/162 |
| 197703 | 1/1977 | U.S.S.R. | 367/183 |

Primary Examiner—Nelson Moskowitz
Attorney, Agent, or Firm—Arnold, White & Durkee

[57] ABSTRACT

A new geophone spring is disclosed wherein the outer and inner rings of the spring are connected by leg members having a substantially straight segment which will pivot about an outer portion of the leg in a manner which will reduce the lateral bending forces acting upon the spring legs and increase the linearity of the spring.

4 Claims, 4 Drawing Figures

GEOPHONE SPRING

BACKGROUND OF THE INVENTION

1. Field of the Invention

The present invention relates to a suspension spring for geophones or seismometers.

2. Description of the Prior Art

Geophones are devices which sense motion by means of suspending an inertial mass structure from a rigid, fixed reference supporting structure. Typically, the mass is a coil suspended by springs in magnetic field, one spring attached at each end of the coil. The effect of the springs is to position the coil within the magnetic field and to give the "suspension system" a pre-determined resonant frequency.

The springs most commonly used in present-day geophones are spider springs which consist of an inner ring and an outer ring with spokes or legs connecting the two rings. Generally, three legs are utilized inasmuch as this is considered the most stable arrangement.

The object of the geophone is to sense movement from only one direction and, therefore, it is desirable to eliminate or minimize the effects of any motion from a direction not parallel to the axis of movement of the suspended coil within the geophone. However, the nature of the spring-suspension system results in a component of vibration along the axis of movement of the suspended coil when the geophone is moved laterally. This produces an undesired or false signal which is referred to in the art as "spurious resonance".

Inasmuch as the geometry and mass (coil) for a given model of geophone are constant within manufacturing limits, the spurious resonance is also constant. Therefore the frequency of this spurious resonance can be raised or lowered by changing the geometry of the suspension springs. This characteristic has provided a means for segregating or eliminating false signals which are generated by lateral movement of the geophone. Usually, the problem is handled by raising the frequency of the spurious resonance to a level well above the frequency spectrum of interest for the geophone. The present state of the art normally requires a ratio of about 30 to 1 of the spurious resonance to the natural frequency of the geophone.

The most common method of achieving the desired ratio of spurious resonance to natural frequency is to shorten the spring legs, thereby raising the frequency of the spurious resonance. While this is an effective method, it has undesirable side effects.

The legs of prior art geophone springs have been of a rectangular cross-section and curved along their lengths between the junctures with the inner ring and outer rings of the spring. The spring is "preformed", that is the inner ring is offset or displaced from the outer ring such that when the mass (coil) is suspended between two such springs, the inner ring, legs, and outer ring of each spring lie in the same plane. The preforming causes a lateral bending force to be exerted upon each spring leg. Due to the characteristics of curved beams, which the spring legs represent, forces acting thereon will cause inner fibers of the beam to be stretched more than outer fibers. Consequently, in the case of the spring legs, the yield point of the material of the legs will be reached first for the inner fibers with the consequence that such fibers will be stretched or distorted out of shape. This can cause the spring to be non-linear and result in the production of a distorted signal from the geophone. This effect is increased when the legs are relatively short and the preforming or offset is large as generally occurs in low frequency geophones with high spurious resonance.

Accordingly, prior to the development of the present invention, geophone springs consisting of an inner and outer ring and legs joining the rings have been characterized by a nonlinearity and the existence of a bending force which distorts the harmonic motion of the spring system and the resulting signal generated by the geophone. Therefore, the art has sought an effective, simple geophone spring which minimizes the problem of harmonic distortion.

SUMMARY OF THE INVENTION

In accordance with the invention, the foregoing benefits have been achieved through the present improved geophone spring. The spring of this invention is to be used in geophones to suspend inertial mass structures from a fixed reference rigid support structure, typically being the suspension of a coil within a magnet field assembly. Seismic oscillations acting upon the geophone cause the spring suspended coil to move through a magnetic field, thus producing an electrical signal indicative of the seismic oscillations. The spring is designed to have an outer ring member, an inner ring member, and leg members connecting the inner and outer ring members. Each leg member has a rectangular cross-section, and includes a substantially straight segment. This straight configuration of the spring legs avoids or minimizes the unequal stressing that occurs in curved beams and is believed to improve the linearity of the spring.

It is a feature of this invention that three leg members may be utilized in the spring wherein the leg members may be sufficiently shortened to achieve a ratio of the spurious resonance of the spring to the natural frequency in the range of 30 to 1 and yet the spring will remain substantially linear and its motion substantially harmonic. Therefore, it is believed that more accurate electrical signals will be generated by the geophone utilizing the spring of this invention.

An additional feature of the present invention is that the leg members of the spring may be designed to consist of three segments, a central substantially straight segment connected to the inner and outer rings by leg segments at either end of the central segment. Pursuant to this arrangement, axial movement of the inner ring will cause the central substantially straight segments of the legs to pivot about the "connecting" leg segments and to laterally move in a manner which reduces the lateral bending forces acting upon the legs whenever the inner ring moves axially away from the plane of the outer ring.

The geophone spring of the present invention, when compared with previously used springs, has the advantages of reducing non-uniform stressing of the spring legs and improving the linearity of the spring, and secondly of reducing the lateral bending forces acting upon the spring legs such that the distortion of signals produced by the geophone are muted.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
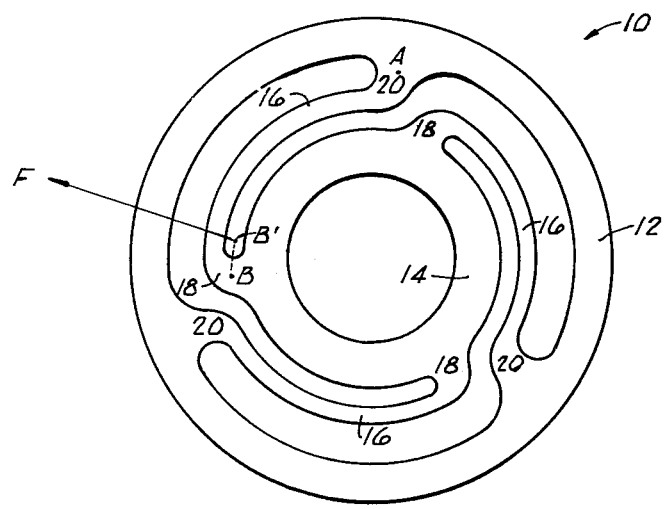
FIG. 1 is a plan view of a typical prior art geophone spring.

In FIG. 1, a plan view of a geophone spring 10 as is presently known in the art is shown. The spring consists of an outer ring 12 and an inner ring 14 which are connected by three legs 16. The legs 16 of the spring 10 are curved about the center of the spring, extending from juncture point 18 at the inner ring to juncture 20 at the outer ring.

Springs used in geophones are generally preformed, that is, the inner ring is offset or displaced axially relative to the plane of the outer ring. When the inner ring is offset in a three-legged spring, which is generally regarded as producing the most stable suspension arrangement, the inner ring is held concentric with the outer ring. In the plan view of the spring 10, point B at juncture 18 is translated to point B' when the inner ring 14 is axially displaced a certain distance up or down from the plane of outer ring 12. This represents a lateral movement of juncture 18 with respect to juncture 20, thereby resulting in a lateral bending force F acting upon the spring leg.

When a curved beam is subjected to a force, the inner and outer fibers of that beam are stressed differently, as will be recognized by those experienced in this field. The curved beam is subjected to the action of equal and opposite couples about the neutral axis of the beam. Inasmuch as the neutral axis of a curved beam will not be coincident with the gravity axis, but will lie between the gravity axis and the inside radius of the beam, the force acting on the inner fibers of the beam will be of a greater magnitude than the force acting on the outer fibers. Consequently, the inner fiber of the curved beam is stressed more than the outer fiber. A more detailed analysis of the physics of this arrangement may be obtained from *STRENGTH OF MATERIALS* by Alfred P. Poorman, 1945, pages 295 through 297.

Therefore, when spring 10 is preformed or when the inner ring 26 is flexed relative to the outer ring 24 in an axial direction during operation of the geophone, the legs 16 are subjected to a lateral bending force F and the inner fibers of the legs 16 are stressed more than the outer fibers. The result of this unequal stressing in the legs is that the inner fibers may reach the yield point of the spring material first with the consequence that they will be stretched or distorted out of shape. This is of special concern when the spring legs have been shortened to increase the frequency of the spurious resonance. The spring may become nonlinear and cause the geophone to generate a distorted signal.

Figure 2:
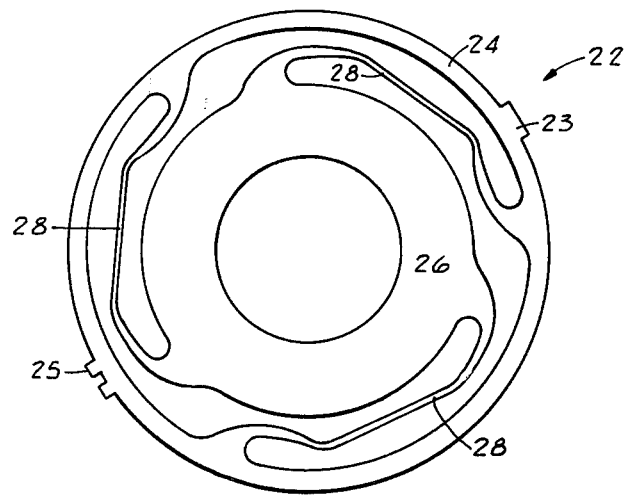
FIG. 2 is a plan view of a geophone spring in accordance with the present invention.

In the preferred embodiment of the geophone spring 22 of this invention, as seen in FIG. 2, outer ring 24 and inner ring 26 are connected by legs 28, which legs have a substantially straight segment. Springs in accordance with this invention may be formed from spring material such as beryllium copper alloy by a process of stamping out the spring configuration or by taking thin discs of an appropriate material and etching slots between the legs and rings.

Flanges 23 and 25 on outer ring 24 may be provided for attachment of the spring 22 to the coil assembly of the geophone. Such flanges may be soldered to the coil assembly and may be received in the coil assembly in a manner which restricts rotational movement of the spring 22 relative to the coil assembly. The inner ring 26 may be retained within the geophone with a slip ring arrangement which permits rotational movement of the spring relative to the fixed reference magnetic field assembly, but fixes the inner ring with respect to motion along the axis of the geophone.

Figure 4:
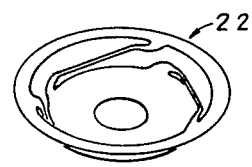
FIG. 4 is a perspective view of a spring of the present invention in a "preformed" state.

When the spring 22 is preformed such as is depicted in FIG. 4, or when axial movement of the outer ring 24 relative to the inner ring 26 is induced by motion acting against the geophone parallel to the axis of the spring, the linearity of spring 22 is much improved for the reason that the inner and outer fibers of the straight segments of legs 28 are stressed equally. This is achieved because the neutral axis of the straight beam segment coincides with the gravity axis, thus producing equal stresses at points in the leg cross-section equidistant from the neutral axis. The improved linearity of the spring 22 results in a less distorted electrical signal being generated by the movement of the spring-mounted coil through the magnetic field.

Figure 3:
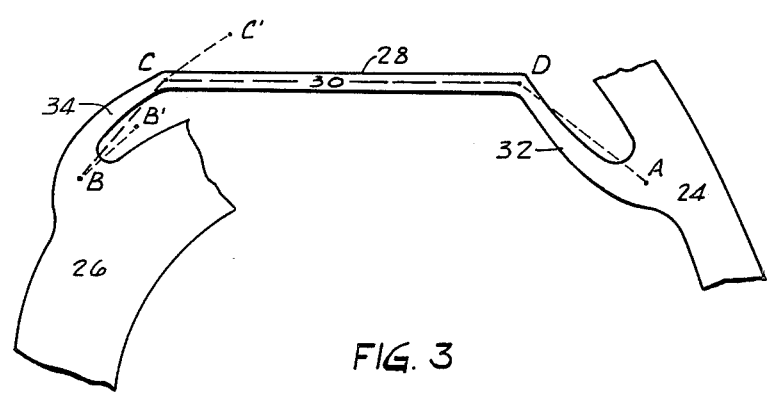
FIG. 3 is a plan view of a leg portion of the geophone spring depicted in FIG. 2.

In FIG. 3, a spring leg for the preferred embodiment of this invention is depicted. The central segment 30 of spring leg 28 is substantially straight and is connected to outer ring 24 and inner ring 26 by arcuate outer segment 32 and arcuate inner segment 34 respectively. In addition to increasing the linearity of the spring by maintaining uniform stressing in the leg 28 between points C and D, the leg configuration of FIG. 3 also reduces or eliminates the lateral bending forces which act upon the leg when the spring is preformed or the outer ring 24 is axially displaced from inner ring 26 during operation of the geophone. This is accomplished by the geometry of the spring leg 28 as illustrated in FIG. 3 and as further explained hereinafter.

When inner ring 26 is offset or displaced a particular distance from outer ring 24 along the axis running concentric to the inner and outer ring, points B and C on leg 28 will be caused to move laterally with respect to point A on outer ring 24 to positions designated as B' and C' respectively. However, when inner ring 26 is axially moved out of the plane of outer ring 24, central leg portion 30, between points C and D, is caused to pivot about a line drawn between points A and D on outer leg segment 32. Similarly, central leg portion 30 is also pivoting about a line drawn between points B and C on inner leg segment 34. The pivoting action of line CD about line AD precipitates a lateral movement of point C on leg 28 with respect to point A toward position C'. If central leg portion 30 was curved, point C would have been constrained such that it would not have accomplished the same lateral movement and a lateral bending force would act on the leg. Inasmuch as the geometry of the spring leg 28 effects a lateral movement of the leg segment CD in the direction in which the lateral bending force would act, the resulting lateral bending force generated on the leg 28 is reduced or eliminated. The reduction of this bending force acting upon the spring legs improves the harmonic response of the geophone spring and hence decreases signal distortion.

The foregoing description of the invention has been directed in primary part to a particular preferred embodiment in accordance with the requirements of the patent statute and for purposes of explanation and illustration. It will be apparent, however, to those skilled in this art that many modifications and changes in this specific device may be made without departing from the scope and spirit of the invention. For example, the spring legs could be comprised of three separate straight segments rather than a central straight segment bounded by arcuate inner and outer segments, as illustrated herein.

It is applicant's intention in the following claims to cover such modifications and variations as fall within the true spirit and scope of the invention.

What is claimed is:

1. A spring, for use in geophones to suspend an inertial mass structure from a fixed reference rigid support structure, which structures are coil and magnet assemblies, comprising:
   an outer member;
   an inner member; and
   a plurality of leg members connecting the outer and inner members wherein each leg member is comprised of:
   a substantially straight segment;
   an outer arcuate segment connecting the substantially straight segment to the outer member; and
   an inner arcuate segment connecting the substantially straight segment to the inner member.

2. The spring of claim 1 wherein three leg members are utilized.

3. The spring of claim 1 wherein the leg members are shortened to achieve a ratio of substantially 30 to 1 for the spurious resonance of the spring to the natural frequency of the spring.

4. A spring, for use in geophones to suspend a coil within a magnetic field assembly, comprising:
   an outer ring member;
   an inner ring member; and
   three leg members, equidistant from one another, and each leg member connecting the outer and inner ring members,
   wherein each leg member is comprised of:
   a central substantially straight segment;
   an arcuate outer segment connecting the central substantially straight segment to the outer ring member; and
   an arcuate inner segment connecting the central substantially straight segment to the inner ring member, such that movement of the inner ring member, relative to the outer ring member, vertically along the axis through the center of the inner ring member causes the central substantially straight segment of the leg member to substantially pivot about the arcuate outer segment of the leg member and to move laterally in the direction which the arcuate inner segment of the leg member moves and thereby reduce the lateral bending forces acting upon the leg member.

* * * * *